(12) United States Patent
Park et al.

(10) Patent No.: US 9,927,570 B2
(45) Date of Patent: Mar. 27, 2018

(54) LIQUID CRYSTAL DISPLAY APPARATUS HAVING A LIGHT GUIDE PLATE WITH OPTICAL PATTERNS TO PREVENT LIGHT LEAKAGE

(71) Applicant: Samsung Display Co., Ltd., Yongin, Gyeonggi-Do (KR)

(72) Inventors: Young-Min Park, Hwaseong-si (KR); Sangwon Lee, Seoul (KR); Younghye Son, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 233 days.

(21) Appl. No.: 14/808,899

(22) Filed: Jul. 24, 2015

(65) Prior Publication Data

US 2016/0245979 A1 Aug. 25, 2016

(30) Foreign Application Priority Data

Feb. 24, 2015 (KR) .......................... 10-2015-0025958

(51) Int. Cl.
 *F21V 8/00* (2006.01)
 *G02F 1/13357* (2006.01)
(52) U.S. Cl.
 CPC ......... *G02B 6/0036* (2013.01); *G02B 6/0038* (2013.01); *G02B 6/0058* (2013.01)
(58) Field of Classification Search
 CPC .. G02B 6/0036; G02B 6/0038; G02B 6/0058; G02F 1/133606; G02F 1/133615
 See application file for complete search history.

(56) References Cited

U.S. PATENT DOCUMENTS

| 8,506,152 B2 * | 8/2013 | Kim .................. G02B 6/0038 349/65 |
| 2008/0258995 A1 * | 10/2008 | Vissenberg ............ B60K 35/00 345/1.1 |
| 2012/0002444 A1 * | 1/2012 | Kim .................... G02B 6/0036 362/613 |

FOREIGN PATENT DOCUMENTS

| JP | 2007-225871 A | 9/2007 |
| JP | 4127098 B2 | 5/2008 |
| KR | 10-2006-0105189 A | 10/2006 |
| KR | 10-2013-0055222 A | 5/2013 |
| KR | 10-2014-0018742 A | 2/2014 |

* cited by examiner

*Primary Examiner* — Anh Mai
*Assistant Examiner* — Nathaniel Lee
(74) *Attorney, Agent, or Firm* — H.C. Park & Associates, PLC

(57) ABSTRACT

A liquid crystal display having a display panel including first and second display regions that are different from each other, a light source supplying light to the display panel, and a light guide plate having an area which is divided into a first region corresponding to the first display region and a second region corresponding to the second display region, the light guide plate allowing light incident from the light source to progress toward, wherein each of the first and second regions includes a light incident surface through which the light is incident, a light emitting surface through which the light successively incident from the light incident surface emits, and a rear surface opposed to the light emitting surface. The light emitting surface of the first region includes a plurality of first optical patterns refracting the light emitted by the light source to prevent light leakage from the first region onto the second display region.

17 Claims, 7 Drawing Sheets

LIQUID CRYSTAL DISPLAY APPARATUS HAVING A LIGHT GUIDE PLATE WITH OPTICAL PATTERNS TO PREVENT LIGHT LEAKAGE

CLAIM OF PRIORITY this application makes reference to, incorporates the same herein, and claims all benefits accruing under 35 U.S.C. § 119 from an application earlier filed in the Korean Intellectual Property Office on the 24$^{th}$ of Feb. 2015 and there duly assigned Serial No. 10-2015-0025958.

BACKGROUND OF THE INVENTION

Field of the Invention

The present disclosure herein relates to a display apparatus including a backlight unit that includes a light guide plate having optical patterns.

Description of the Related Art

Generally, a liquid crystal display is a device for displaying a desired image by adjusting light transmittance of liquid crystal cells arranged in a matrix configuration according to image signal information. The liquid crystal display forms an image on a liquid crystal panel using light supplied from a backlight unit.

Since the liquid crystal display using the aforementioned principle has characteristics such as light weight, slimness, and low power consumption, its application has extended. The liquid crystal display is used in office automation devices or audio/video devices according to such a tendency. In the liquid crystal display, transmittance of light is adjusted according to signals applied to a plurality of control switches arranged in a matrix configuration to display a desired image on a screen.

Recently, the liquid crystal display is widely applied to a monitor for a computer, a display apparatus for a television as well as for a vehicle navigation system, and portable display apparatuses for a notebook, a handheld terminal, and the like. Since most of the liquid crystal displays are non-emissive type displays which adjust an amount of light incident from the outside to display an image, these liquid crystal displays require backlight units including a separates light source for irradiating light on a liquid crystal display panel.

The backlight unit includes an light emitting diode that is a light source, a light guide plate coupled to a light-emitting surface of the light emitting diode, and a plurality of sheets on the light guide plate.

Light incident to the light guide plate from the light emitting diode is totally reflected on an interface due to a refractive index difference from air, is emitted through a light-emitting surface, and is supplied to a liquid crystal panel.

SUMMARY OF THE INVENTION

The present disclosure prevents a light leakage phenomenon between a plurality of display regions independently driven in a display apparatus including the plurality of display regions.

Embodiments of the invention provide display apparatuses including: a display panel including first and second display regions that are different from each other; a light source supplying light to the display panel; and a light guide plate having an area which is divided into a first region corresponding to the first display region and a second region corresponding to the second display region, the light guide plate allowing light incident from the light source to progress toward, wherein each of the first and second regions includes a light incident surface through which the light is incident, a light emitting surface through which the light successively incident from the light incident surface emits, and a rear surface opposed to the light emitting surface. The light emitting surface of the first region may include a plurality of first optical patterns.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Terms used in this specification are selected as general terms that are widely used today while considering the functions of the present specification, but may vary depending on intention of engineers engaged in the art, practices or the advent of new technologies. Also, in certain cases, the terms are randomly selected by an applicant, and in this case, the meaning will be described in the description of the corresponding embodiment. Accordingly, a term used herein shall be interpreted based on practical meanings and the contents throughout the specification instead of a simple name of the term.

Moreover, although exemplary embodiments are described in detail with reference to the accompanying drawings and contents described therein, it should be understood that the disclosure is not limited to or restricted by the embodiments.

Hereinafter, exemplary embodiments of the invention will be described in more detail with reference to the accompanying drawings.

Figure 1A:
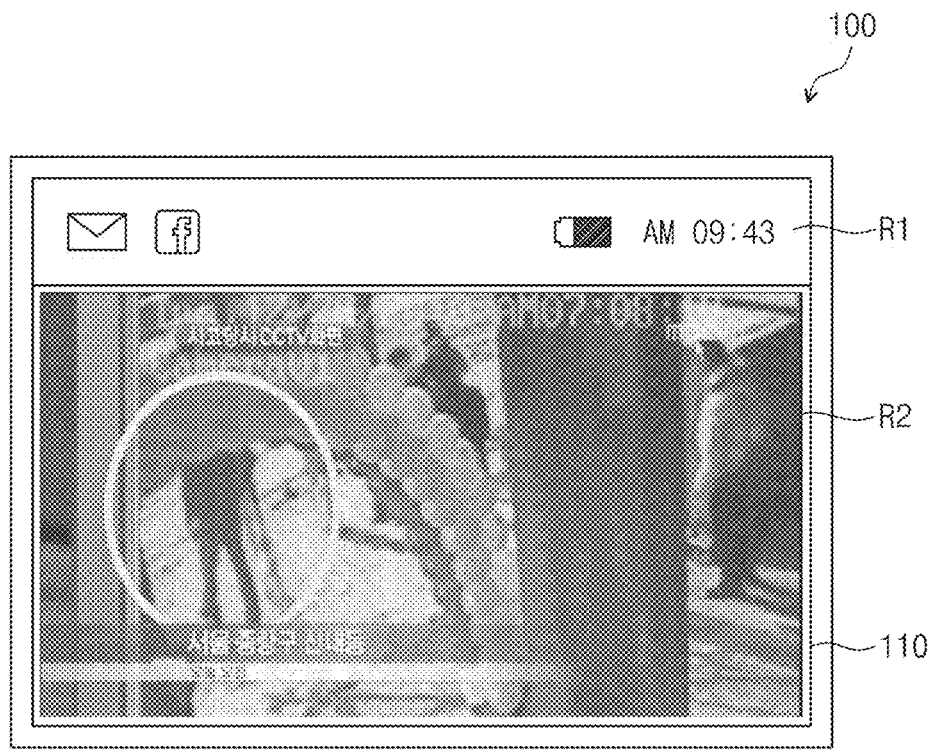
FIG. 1A is a view illustrating a display apparatus according to an embodiment of the invention.
Figure 1B:
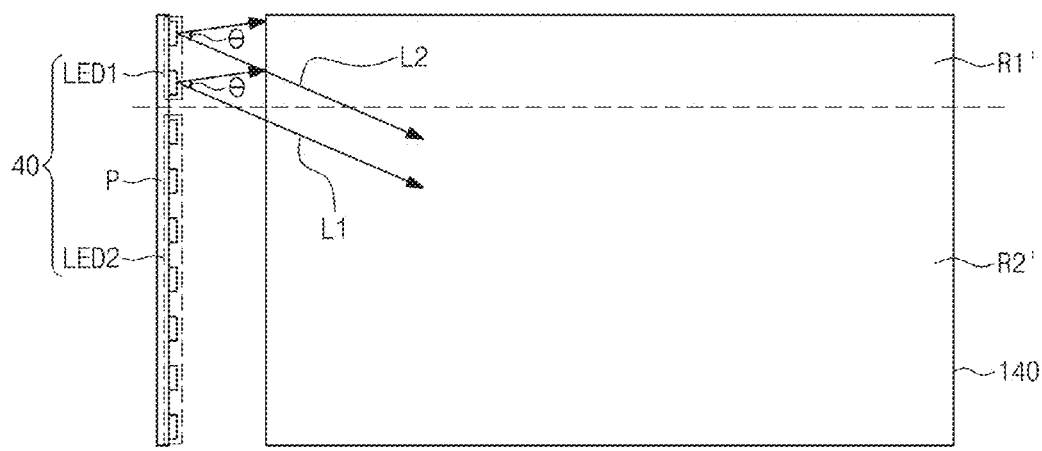
FIG. 1B is a plan view of a backlight unit included in a display apparatus illustrated in FIG. 1A.

FIG. 1A is a view illustrating a display apparatus according to an embodiment of the invention. FIG. 1B is a plan view of a backlight unit included in a display apparatus illustrated in FIG. 1A;

Referring to FIG. 1A, a display apparatus 100 may include a display panel 110 displaying an image. The display panel 110 may include first and second display regions R1 and R2 which are independently driven according to a driving method, displayed content, function, or the like.

In an embodiment, the display panel 110 may include the first display region R1 that is a sub region displaying simple information and a second display region R2 that is a main display region displaying detailed information.

The first region R1 may display real-time information. For example, the first display region R1 may display simple information related to an event generated in real time in the display apparatus 100 or in a mobile device pairing with the display apparatus 100. The first display region R1 may display information on the number of messages, the number of calls, a caller, or the like received in the mobile device in real time. Also, the first display region R1 may display real-time information related to environmental conditions with respect to current time, current weather, current temperature, or the like.

The second display region R2 may display various contents played in the display apparatus 100. For example, the second display region R2 may display detailed information related to an event generated in the display apparatus 100 or in the mobile device pairing with the display apparatus 100. The second display region R2 may display a received message text, detailed information on a received call, information on a caller list, or the like. Also, the second display region R2 may display various contents executed in the display apparatus 100, such as a movie, drama, game, or TV application.

Since the first display region R1 displays simple information such as real time state information, the first display region R1 may have a size relatively smaller than that of the second display region R2.

Also, since the first display region R1 provides state information in real time, the first display region R1 may be continuously driven. On the contrary, the second display region R2 may be intermittently driven according to user input. For example, the first display region R1 is maintained to be turned on even if a user turns off the second display region R2, so that the first display region R1 may continuously provide state information on current information, current weather, current temperature, or the like to the user. Therefore, the first display region R1 is continuously driven in regardless of input for deactivating the second display region R2, and thus may provide real-time information with respect to the display apparatus 100 to the user.

Since the first and second display regions R1 and R2 perform different functions, the first and second display regions R1 and R2 may be independently driven. However, in this case, a light leakage phenomenon may be generated between the first and second display regions R1 and R2.

In more detail, referring to the FIG. 1B, a backlight unit providing light to the display panel 110 may include a light source unit 40 and a light guide plate 140. In addition, the light source unit 40 may include a plurality of light sources LED1 and LED2, and a panel P mounted with the plurality of light sources LED1 and LED2. The plurality of light sources LED1 and LED2 provided to the light source unit 40 allow light to be incident on the light guide plate 140. Also, the light incident on the light guide plate 140 may be reflected inside the light guide plate 140 and be emitted through a light emitting surface of the light guide plate 140. The emitted light may be provided to the display panel 110 opposed to the light guide plate 140.

At least one first light source LED1 providing light to the first display region R1 may irradiate light on a first region R1' of the light guide plate 140 corresponding to the first display region R1. In more detail, the first light source LED1 may irradiate light on a light-incident surface of the first region R1'.

At least one second light source LED2 providing light to the second display region R2 may irradiate light on a second region R2' of the light guide plate 140 corresponding to the second display region R2. In more detail, the second light source LED2 may irradiate light on a light-incident surface of the second region R2'.

When only the first display region R1 is selectively driven, the first light source LED1 may irradiate light having a specific incident angle range on the light-incident surface of the first region R1'. Since the first light source LED1 irradiates light at a specific incident angle θ, light L1 incident on the second region R2' may exist. Alternatively, light L2, which is incident on the incident-surface of the first region R1' and then is incident on the second region R2', may exist. Alternatively, although light is incident on the light-incident surface of the first region R1' and emitted to the light emitting surface of the first region R1, the light, which is incident not on the first display region R1 but on the second display region R2, may exist due to low straightness of the light. As a result, a light leakage phenomenon, in which light provided from the first light source LED1 in order to drive the first display region R1 is emitted to the second display region R2, is generated. When only the first display region R1 is driven, such a light leakage phenomenon is easily visible to the user, so that the quality of the display apparatus 100 is lowered.

In order to prevent the light leakage phenomenon, the display apparatus 100 according to an embodiment of the invention may include a light guide plate on which optical patterns for preventing the light leakage are formed.

Figure 2:
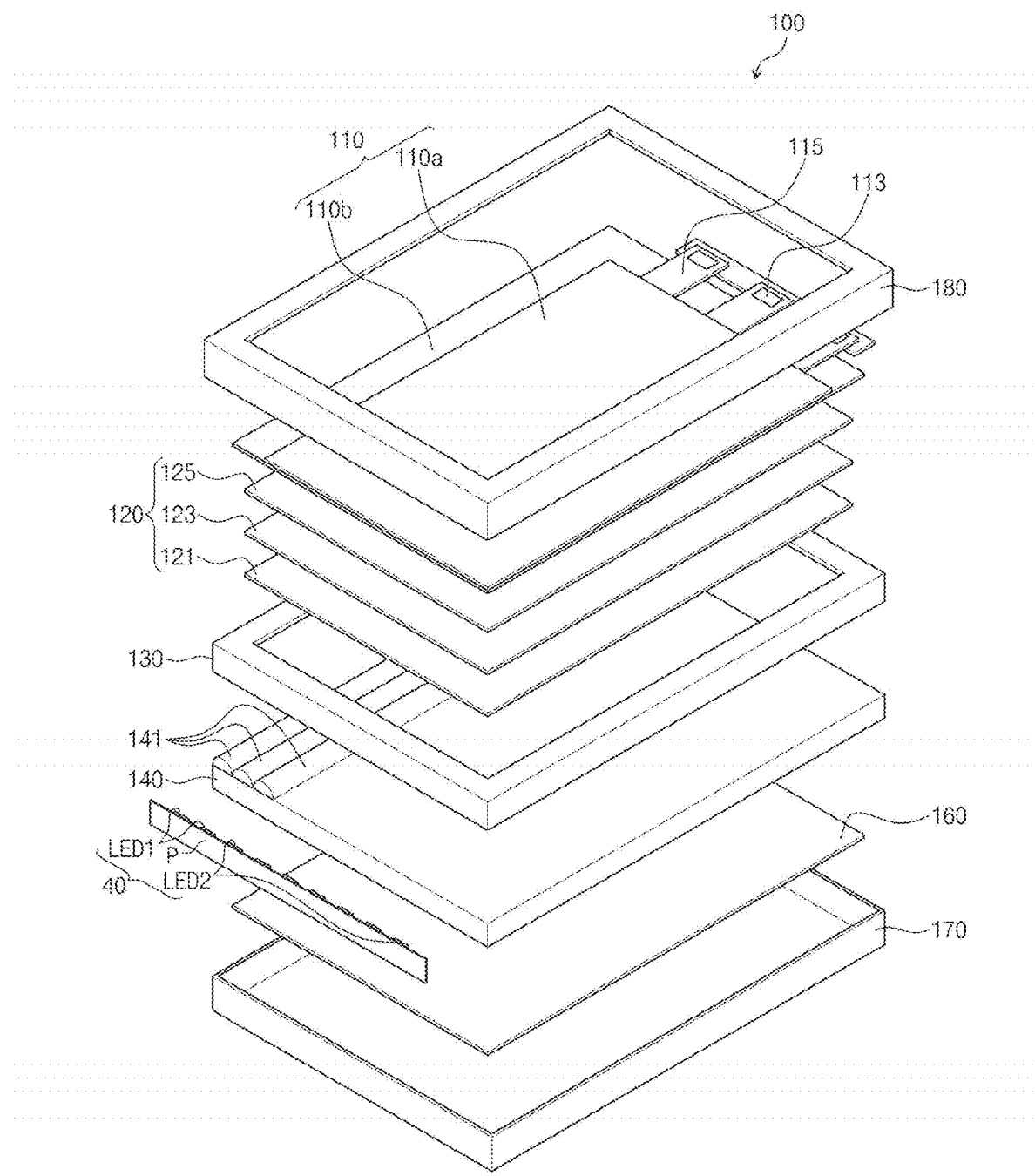
FIG. 2 is an exploded perspective view of a display device including a backlight unit provided with a light guide plate according to an embodiment of the invention.

FIG. 2 is an exploded perspective view of a display device including a backlight unit provided with a light guide plate according to an embodiment of the invention.

Referring to FIG. 2, a display apparatus 100 may include a display panel 110, a backlight unit providing light to the display panel 110, a panel guide 130 covering and supporting the display panel 110 and the backlight unit, a bottom cover 170 coupled to the panel guide 130 and receiving the backlight unit, and a top case 180 covering a front edge of the display panel 110.

The display panel 110 may include a color filter array substrate 110a, a TFT array substrate 110b, and a liquid crystal layer (not shown) therebetween. In the display panel 110, liquid crystal cells each constituting a pixel unit may be arranged in a matrix configuration, and the liquid crystal cells adjust light transmittance according to a signal transmitted from a pixel driving circuit 113 to display an image.

Although not shown in FIG. 2, a plurality of gate lines and a plurality of data lines are disposed in a matrix configuration on the TFT array substrate 110b so as to intersect with each other. Also, a thin film transistor (TFT) may be provided on the intersecting region of each gate line and each data line. Signal voltage transferred from the pixel driving circuit 113 is applied between a pixel electrode and a common electrode (not shown) of the color filter array substrate 110a described later through the thin film transistor. Liquid crystal molecules between the pixel electrode and the common electrode may be arranged according to the signal voltage to determine light transmittance. Although not shown, the color filter array substrate 110a may include a color filter and a common electrode with a black matrix in-between. The common electrode is made of a transparent conductive material such as indium tin oxide (ITO) or indium zinc oxide (IZO).

The flexible printed circuit board 115 may be disposed such that one end thereof is connected to one side of the display panel 110. The pixel driving circuit 113 for driving pixels of the display panel 110 may be provided on the flexible printed circuit board 115.

The backlight unit may include a light source unit 40 generating light and a light guide plate 140 propagating light generated in the light source unit 40 toward the display panel 110. The light source unit 40 may be disposed on one side surface of the light guide plate 140. Also, the backlight unit may include a reflective sheet 160 attached to a rear surface of the light guide plate 140 to reflect light incident on the rear surface toward the display panel 110 and to thereby improve light efficiency, and a plurality of optical sheets 120 stacked on a light emitting surface of the light guide plate 140 to scatter light emitted from the light guide plate 140.

The light source unit 40 may include light sources LED1 and LED2 generating light, and a panel P mounted with the first and second light sources LED1 and LED2. Each of the first and second light sources LED1 and LED2 may be a cold cathode fluorescent lamp (CCFL), an external electrode fluorescent lamp (EEFL), or a light-emitting diode (LED) element. Hereinafter, for convenience in description, an embodiment in which the first and second light sources LED1 and LED2 are light-emitting diodes (LEDs) will be described.

The panel P mounted with the light sources LED1 and LED2 is a flexible printed circuit board, and may provided therein with an inner circuit providing external power to the light sources LED1 and LED2.

The light guide plate 140 functions to guide light incident from the light sources LED1 and LED2 so as to be incident on the display panel 110. The light guide plate 140 may have a structure in which one surface thereof is inclined, an opposite surface thereof opposed to the one surface has a wedge shape, or the one surface and the opposite surface all have a flat pate type.

Various optical patterns 141 for controlling light may be formed on a surface of the light guide plate 140. In particular, various optical patterns 141 for preventing light leakage may be formed on the light guide plate 140 according to an embodiment of the invention. Details thereof will be described below with reference to FIGS. 3A to 5B.

The plurality of optical sheets 120 is provided to diffuse and collect light incident from the light guide plate 140, and may include a diffusion sheet 121, a prism sheet 123, and a protection sheet 125. The number of the diffusion sheet 121, and the prism sheet 123, and the protection sheet may be variously determined according to embodiments.

The diffusion sheet 121 may function to diffuse light provided from the light source unit 40 and to provide the diffused light to the display panel 110. Triangular prisms may be formed in a predetermined arrangement on one surface of the prism sheet 123. The prism sheet 123 may function to collect light diffused in the diffusion sheet 121 in a direction orthogonal to a surface of the display panel 110. The protection sheet 125 may function to protect the prism sheet 123 vulnerable to scratch.

The panel guide 130 may have a square frame shape surrounding side surfaces of the light guide plate 140, and be formed of a plastic material such as a PC material or metal material. The panel guide 130 functions to support and fix the display panel 110, the light guide panel 140, and the optical sheets 120.

The reflective sheet 160 may be disposed on a rear surface of the light guide plate 140 to reflect a portion of light emitted to the rear surface of the light guide plate 140 toward the light emitting surface, thereby improving light efficiency, and to adjust a total reflected amount of incident light to allow the entire light emitting surface to have uniform luminance distribution.

The bottom cover 170 has a rectangular box shape of which one side is open, and receives constituent elements of the backlight covered by the panel guide 130.

The bottom cover 170 is coupled to the top case 180 surrounding outer edges of an upper surface of the display panel 110 and a side surface of the panel guide 130 to constitute a display apparatus 100.

Figure 3A:
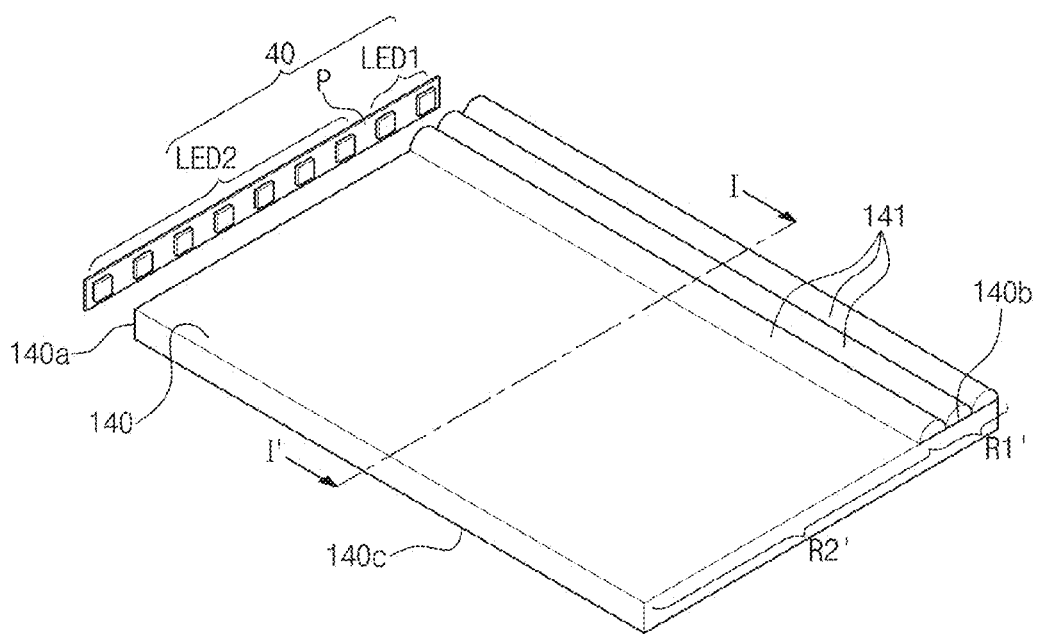
FIG. 3A is an exploded perspective view of a backlight unit according to an embodiment of the invention.
Figure 3B:
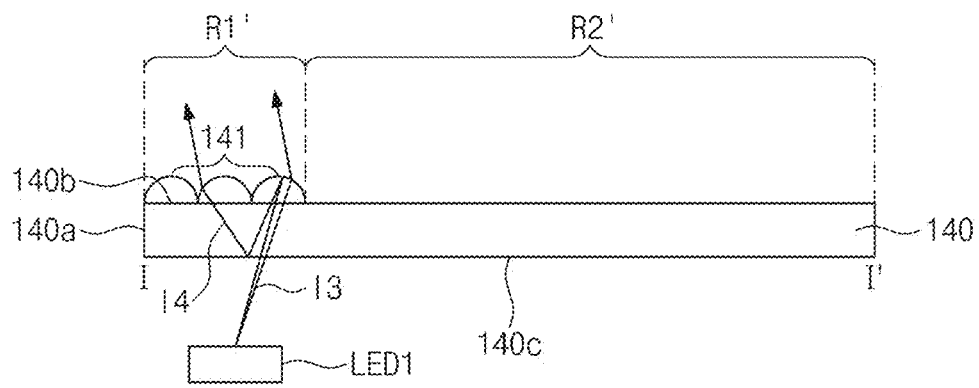
FIGS. 3B and 3C are cross-sectional views taken along line I-I' of a light guide plate according to an embodiment of the invention.
Figure 3C:
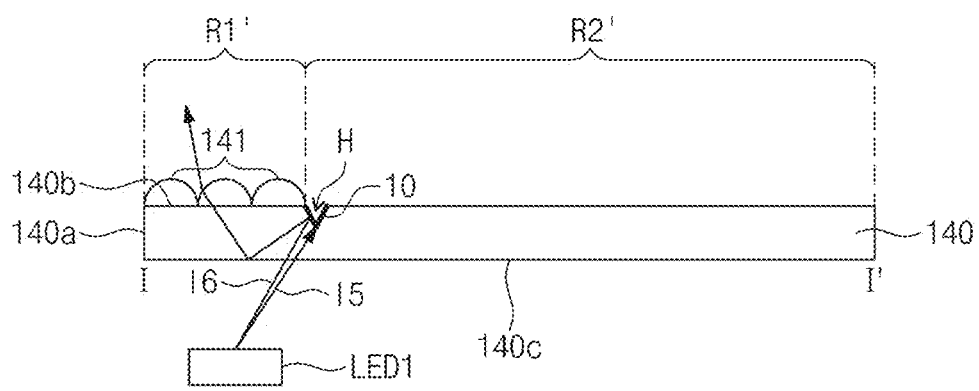

FIG. 3A is an exploded perspective view of a backlight unit according to an embodiment of the invention. FIGS. 3B and 3C are cross-sectional views taken along line I-I' of a light guide plate according to an embodiment of the invention. In particular, FIG. 3B is a cross-sectional view of the light guide plate illustrated in FIG. 3A. Optical sheets and reflective sheets are excluded in the present drawings in order to efficiently describe characteristics of the invention. Also, descriptions will be made on the basis of the backlight unit of the display apparatus in which only the first display region R1 of display panel 110 is driven. Further, the position of LED1 is represented as from the side of the light guide plate, not from beneath the light guide plate.

Referring to FIG. 3A, a light guide plate 140 may include a light-incident surface 140a on which light from light sources LED1 and LED2 is incident, a light emitting surface 140b through which light continuously incident from the light-incident surface 140a is emitted, and a rear surface 140c opposite to the light emitting surface 140b.

At least one first light source LED1 supplying light to the first display region R1 may be disposed so as to correspond to the light-incident surface 140a of a first region R1' of the light guide plate 140 which corresponds to the first display region R1 of display panel 110. Also, at least one second light source LED2 supplying light to the second display region R2 may be disposed so as to correspond to the light-incident surface 140a of a first region R2' of the light guide plate 140 which corresponds to the second display region R2 of display panel 110. The first light source LED1 and the second light source LED2 may independently irradiate light on the light-incident surface 140a of the first region R1' and the light-incident surface 140a of the second region R2', respectively.

First optical patterns 141 may be formed on a portion of the light emitting surface 140b which corresponds to the first region R1'. The first optical patterns 141 may have a lenticular lens shape or semi-cylindrical lens shape. In this case, each of the first optical patterns 141 may have a concave shape with respect to a light emitting direction. Alternatively, each of the first optical patterns 141 may have a cross-section protruding away from the light guide plate 140. The first optical patterns 141 may function to prevent a light leakage phenomenon into the second display region R2.

Referring to FIG. 3B, light 13 incident on the first region R1' of the guide plate 140 from the first light source LED1 may be refracted by the first optical patterns 141 formed on the light emitting surface 140b of the first region R1' to be emitted. In particular, light passing through the first optical patterns 141 may be refracted in a direction directed away from the second region R2' to the first display region R1 to be emitted. As a result, the light 13 passing through the first optical patterns 141 may be improved in terms of straightness of light traveling from the light guide plate 140 to the display panel 110. Accordingly, when the first display region R1 is solely driven, an amount of light incident on the second display region R2 is reduced, so that a light leakage phenomenon into the second display region R2 may be prevented.

Alternatively, a portion 14 of light incident on the first region R1' of the light guide plate 140 from the first light source LED1 may be re-incident on the rear surface 140c of the first region R1' by the first optical patterns 141 formed on the light emitting surface 140b of the first region R1', and then be emitted through the light emitting surface 140b of the first region R1' by the reflective sheet 160 (FIG. 2) provided on the rear surface 140c. In particular, the portion 14 of light re-incident on the rear surface 140c may travel in a direction away from the second display region R2 to the first display region R1. As a result, the portion 14 of light reflected by the first optical patterns 141 travels in an inner direction of the first region R1', so that an amount of light incident on the second display region R2 is reduced, and accordingly, a light leakage phenomenon may be prevented.

This is because the first optical patterns 141 have a concave shape or a lenticular shape to improve straightness of light passing through the first optical patterns 141, and to allow light capable of traveling toward the second display region R2 to be re-incident inside the first region R1' and emitted on the the first display region R1.

The first optical patterns 141 may be formed by attaching a lenticular-shaped film or tape to the light emitting surface 140b of the first region R1' of the light guide plate 140 or partially patterning the light emitting surface 140b of the first region R1' of the light guide plate 140. In the present specification, for convenience in description, descriptions have been made on the basis of the light guide plate 140 in which the lenticular-shaped film is partially attached to the light emitting surface 140b of the first region R1' of the light guide plate 140.

In order to further improve the light leakage preventing effect, as described in FIG. 3C, the light guide plate 140 may be provided with a light leakage preventing groove "H" in the light emitting surface 140b between the first and second regions R1' and R2'. In other words, the light guide plate 140 may be provided with the light leakage preventing groove "H" in a portion of the light emitting surface 140b corresponding to a boundary of the first and second display regions R1 and R2. The light leakage preventing groove "H" has a shape that is dented toward an inside of the light emitting guide 140 and has a triangular cross-section.

A light leakage preventing film 10 for preventing a light leakage may be attached to a surface of the light leakage preventing groove "H". The light leakage preventing film 10 may absorb light 15 incident on a surface thereof, or allow light 16 to be re-incident on a rear surface 140c of the first region R1, thereby reducing an amount of light incident on the second region R2'.

Figure 4A:
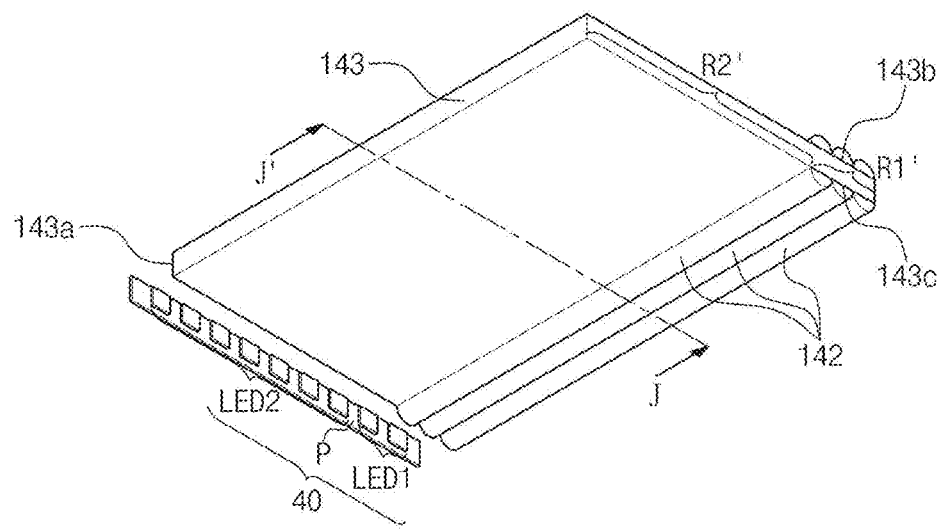
FIG. 4A is an exploded perspective view of a backlight unit according to an embodiment of the invention.
Figure 4B:
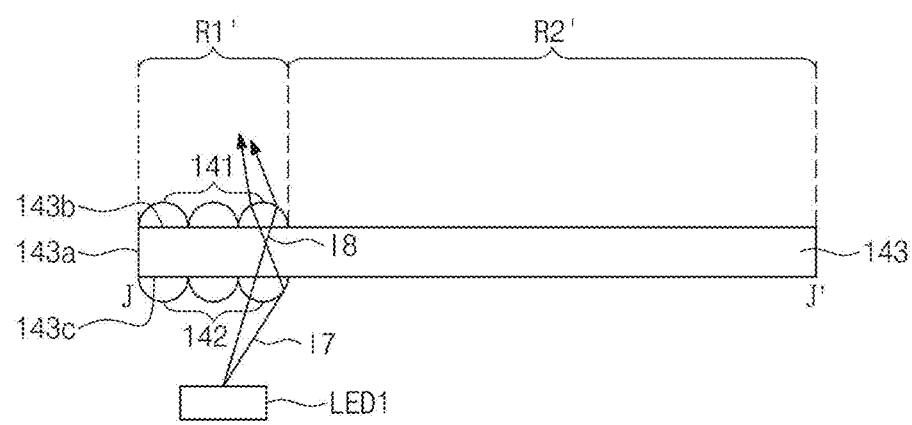
FIG. 4B is a cross-sectional view taken along line J-J' of a light guide plate illustrated in FIG. 4A.

FIG. 4A is an exploded perspective view of a backlight unit according to an embodiment. FIG. 4B is a cross-sectional view taken along line J-J' of a light guide plate illustrated in FIG. 4A. The same elements as the elements relating to FIGS. 1 to 3C described as above will be described by using the like reference numerals in the present drawings and detailed descriptions relating to FIGS. 1 to 3C may be applied in the present embodiments in the same or similar manner. Also, the present drawings will be described on the basis of a backlight unit of a display apparatus in which only the first display region R1 is driven. Further, the position of LED1 is represented as from the side of the light guide plate, not from beneath the light guide plate.

Referring to FIGS. 4A and 4B, a light guide plate 143 may be provided with a light emitting surface 143b as well as a plurality of second optical patterns 142 for preventing a light leakage even on a rear surface 143c of a first region R1' corresponding to the first display region R1. The second optical patterns 142 may be formed on the rear surface 143c of the first region R1' so as to respectively one-to-one correspond to the first optical patterns 141. The first optical patterns 141 and the second optical patterns 142 may be opposed to each other.

The second optical patterns 142 has a reflective surface that may also have a lenticular lens shape or semi-cylindrical lens shape like the first optical patterns 141. In this case, each of the second optical patterns 142 may have a concave shape with respect to an opposite direction to a light emitting direction of light. Also, each of the second optical patterns 142 may have a cross-section protruding toward the outside of the light guide plate 143. The second optical patterns 142 may be formed by attaching a lenticular-shaped film or tape to the rear surface 143c of the first region R1' of the light guide plate 143 or partially patterning the rear surface 143c of the first region R1' of the light guide plate 143. Also, the second optical patterns 142 may function to prevent a light leakage phenomenon into the second display region R2 like the first optical patterns 141.

In more detail, light 17 incident on a light-incident surface 143a of the first region R1' from a first light source LED1 may travel to the rear surface 143c on which the second optical patterns 142 are formed. The light 17 traveling to the rear surface 143c may be reflected toward the light emitting surface 143b of the first region R1' by the second optical patterns 142. In particular, the light 17 may travel in a direction directed from the second display region R2 to the first display region R1, that is, toward an inside of the first display region R1 and the light emitting surface 143b. Thus, the light 17 incident on the light emitting surface 143b may be improved in terms of straightness of light to be emitted to the first display region R1. As a result, when the first display region R1 is solely driven, an amount of light incident on the second display region R2 is reduced, so that a light leakage phenomenon into the second display region R2 may be prevented.

Also, a portion 18 of light re-incident on the second optical patterns 142 by the first optical patterns 141 may be also reflected toward an inside of the first region R1' and the light emitting surface 143b by the second optical pattern 142. The portion 18 of the light incident on the light emitting surface 143b may be improved in terms of straightness of light by the first optical patterns 141 to be emitted to the first display region R1. As a result, an amount of light, which is incident on the second display region R2 that is not driven, is reduced, so that the light leakage phenomenon is prevented.

Although not shown in the present drawings, optical patterns having the same lenticular lens shape or semi-cylindrical lens shape as that of the first or second optical patterns (141 and 142) may be additionally formed even on the light emitting surface 143b of the second region R2'. The optical patterns formed on the light emitting surface 143b of the second region R2' may function to prevent light of the second display region R2 from leaking into the first display region R1 in the similar manner as the first and second optical patterns 141 and 142.

Figure 5A:
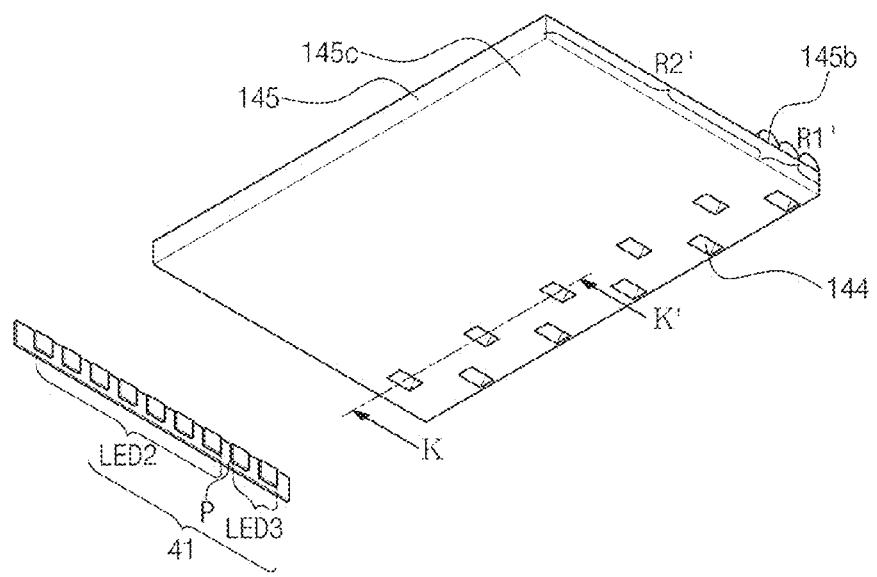
FIG. 5A is an exploded perspective view of a backlight unit according to an embodiment of the invention.
Figure 5B:
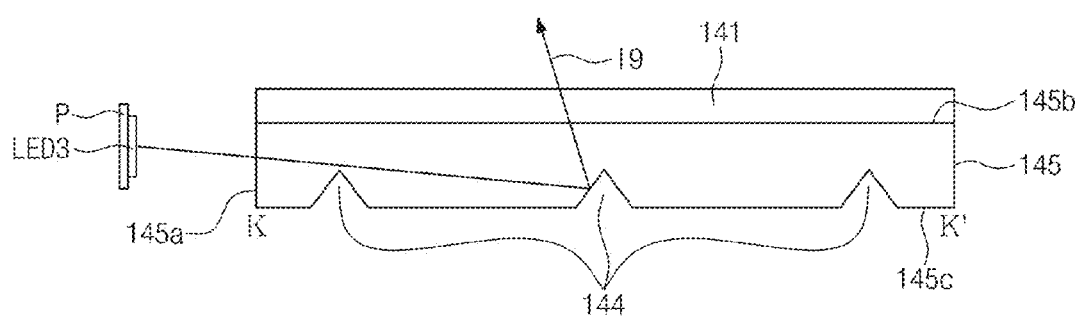
FIG. 5B is a cross-sectional view taken along line K-K' of a light guide plate illustrated in FIG. 5A.

FIG. 5A is an exploded perspective view of a backlight unit according to an embodiment. FIG. 5B is a cross-sectional view taken along line K-K' of a light guide plate illustrated in FIG. 5A. The same elements as the elements relating to FIGS. 1 to 3C described as above will be described by using the like reference numerals in the present drawings and detailed descriptions relating to FIGS. 1 to 3C may be applied in the present drawings in the same or similar manner. Also, the present drawings will be described on the basis of a backlight unit of a display apparatus 100 in which only the first display region R1 is driven.

Referring to FIGS. 5A and 5B, a light source LED3 may include a narrow beam angle LED element. The narrow beam angle LED element means a light-emitting diode element having a relatively narrow beam angle ranging from about 5° to about 50°. Since the light source LED3 includes the narrow beam angle LED element, the amount of light incident on a light-incident surface 145a of a second region R2' from the light source LED3 may be reduced. As a result, the light leakage phenomenon of the second display region R2, which is generated by light incident on the second region R2', may be prevented. The light source LED2 may also include a narrow beam angle LED element, or a wide beam angle LED element.

Narrow beam angle light incident on the light-incident surface 145a of the first region R1' from the light source LED3 may be reflected toward a light emitting surface 145b of the first region R1' by third optical patterns 144. The third optical patterns 144 may function to reflect the narrow beam angle light incident from the light source LED3 toward the light emitting surface 145b. The third optical patterns 144 may be formed on a rear surface 145c of the first region R1' so as to be opposed to the first optical patterns 141, and have a shape dented toward an inside of a light guide plate 145. Also, the third optical patterns 144 may have a triangular cross-section. For example, the third optical patterns 144 may have a concave pattern. The straightness of the narrow beam angle light 19 is improved by the third optical patterns 144, so that luminance of the first display region R1 may be improved.

Since a display apparatus according to an embodiment of the invention includes a light guide plate on which optical patterns for preventing a light leakage are formed, a light leakage phenomenon between display regions independently driven may be prevented.

Although respective drawings have been described individually for convenience in description, a foldable display apparatus may be designed such that the embodiments illustrated in the respective drawings may be merged to realize a new embodiment. Also, the display apparatus 100 is not limited to the configurations and methods of the above-described embodiments, but all or some of the respective embodiments may be selectively combined and executed so that various modifications can be made within the scope of the disclosure as claimed.

Although preferred embodiments of the invention have been illustrated and described, the invention is not limited to the above-mentioned embodiments and various modified embodiments may be available by those skilled in the art without the scope of the appended claims of the invention. In addition, these modified embodiments should not be appreciated separately from technical spirits or prospects.

What is claimed is:

1. A display apparatus comprising:
   a display panel including first and second display regions;
   a light source supplying light to the display panel;
   a light guide plate having a first region corresponding to the first display region and a second region corresponding to the second display region, the light guide plate allowing light incident from the light source to progress to the display panel; and
   a plurality of first optical patterns disposed on the light guide plate,
   wherein:
   each of the first and second regions comprises a light incident surface through which the light is incident, a light emitting surface through which the light is emitted, and a rear surface opposed to the light emitting surface;
   the first optical patterns are disposed only on the light emitting surface overlapping with the first region among the first region and the second region and have a shape protruding from the light emitting surface of the first region;
   each of the first and second display regions is independently driven;
   the first display region is a sub display region configured to be continuously driven; and
   the second display region is a main display region configured to be intermittently driven according to user input.

2. The display apparatus of claim 1, wherein:
   the sub display region is configured to display real time information; and
   the main display region is configured to display image content executed in the display apparatus.

3. The display apparatus of claim 1, wherein the first optical patterns prevent light leakage from the first region to the second display region, when the second display region is not driven.

4. The display apparatus of claim 1, wherein each of the first optical patterns has a lenticular shape.

5. The display apparatus of claim 1, wherein each of the first optical patterns has a semi-cylindrical shape.

6. The display apparatus of claim 1, further comprising a plurality of second optical patterns disposed on the rear surface of the first region,
   wherein the second optical patterns have a semi-cylindrical shape protruding from the rear surface of the first region and overlap the first optical patterns.

7. The display apparatus of claim 6, wherein the second optical patterns are formed to correspond to the first optical patterns in one-to-one relationship.

8. The display apparatus of claim 7, wherein each of the second optical patterns has a lenticular shape.

9. The display apparatus of claim 1, wherein the light guide plate further comprises a light leakage preventing groove formed in the light emitting surface between the first and second regions.

10. The display apparatus of claim 9, wherein the light guide plate further comprises a light leakage preventing film on a surface of the light leakage preventing groove.

11. The display apparatus of claim 9, wherein the light leakage preventing groove has a V shape recessed to an inner side of the light guide plate.

12. The display apparatus of claim 9, wherein the light leakage preventing groove has a triangular cross-section.

13. The display apparatus of claim 1, wherein the light source comprises:
   at least one first light source providing light to the first display region; and
   at least one second light source providing light to the second display region.

14. The display apparatus of claim 13, wherein:
the first light source is a narrow beam angle light emitting diode (LED) element, and
the second light source is a narrow beam angle light LED element or a wide beam angle LED element.

15. The display apparatus of claim 14, wherein the rear surface of the first region comprise third optical patterns for reflecting the light incident from the first light source.

16. The display apparatus of claim 15, wherein each of the third optical patterns has a shape recessed toward an inner side of the light guide plate.

17. The display apparatus of claim 16, wherein the third optical patterns have a triangular cross-section.

* * * * *